US008602429B2

(12) United States Patent
Nguyen

(10) Patent No.: US 8,602,429 B2
(45) Date of Patent: Dec. 10, 2013

(54) CUP DEVICE FOR ADDITIONAL SUSPENSION

(75) Inventor: Hoang Minh Nguyen, Irwindale, CA (US)

(73) Assignee: Platinum VIP, Inc., Irwindale, CA (US)

( * ) Notice: Subject to any disclaimer, the term of this patent is extended or adjusted under 35 U.S.C. 154(b) by 0 days.

(21) Appl. No.: 12/871,497

(22) Filed: Aug. 30, 2010

(65) Prior Publication Data

US 2012/0104704 A1      May 3, 2012

(51) Int. Cl.
  *B60G 11/58*      (2006.01)
  *B60G 17/027*     (2006.01)

(52) U.S. Cl.
  USPC ............. 280/124.162; 267/34; 280/6.157

(58) Field of Classification Search
  USPC .......... 267/34, 64.11, 64.15, 64.28, 221, 248, 267/249; 280/6.157, 124.145–124.147, 280/124.154, 124.155, 124.157, 280/124.16–124.162, 124.179
  See application file for complete search history.

(56) References Cited

U.S. PATENT DOCUMENTS

| | | | | |
|---|---|---|---|---|
| 1,055,734 A * | 3/1913 | Funk | | 267/34 |
| 1,214,120 A * | 1/1917 | Bayne | | 267/29 |
| 1,574,000 A * | 2/1926 | Roberts | | 267/64.11 |
| 2,094,882 A * | 10/1937 | Garnett et al. | | 280/104 |
| 2,638,339 A * | 5/1953 | Taylor | | 267/128 |
| 3,037,763 A * | 6/1962 | Steinhagen | | 267/34 |
| 3,149,829 A * | 9/1964 | Baum | | 267/34 |
| 3,476,354 A * | 11/1969 | Stubblefield | | 251/63 |
| 3,801,085 A * | 4/1974 | Sandor | | 267/226 |
| 4,159,105 A * | 6/1979 | Vander Laan et al. | | 267/218 |
| 4,318,535 A * | 3/1982 | Imai | | 267/226 |
| 4,398,704 A * | 8/1983 | Buchanan et al. | | 267/64.21 |
| 4,830,395 A * | 5/1989 | Foley | | 280/124.162 |
| 5,044,614 A * | 9/1991 | Rau | | 267/221 |
| 5,450,908 A * | 9/1995 | Hagman et al. | | 172/239 |
| 5,454,550 A * | 10/1995 | Christopherson | | 267/221 |
| 6,676,119 B2 * | 1/2004 | Becker et al. | | 267/218 |
| 7,364,142 B2 * | 4/2008 | Beck | | 267/64.17 |
| 7,380,799 B2 * | 6/2008 | Niaura et al. | | 280/5.519 |
| 7,475,883 B2 * | 1/2009 | Christophel et al. | | 280/5.514 |
| 7,954,792 B2 * | 6/2011 | Adonakis | | 267/64.27 |
| 8,262,100 B2 * | 9/2012 | Thomas | | 280/5.514 |
| 2005/0189685 A1 * | 9/2005 | Verriet | | 267/34 |

* cited by examiner

*Primary Examiner* — Joseph Rocca
*Assistant Examiner* — Laura Freedman
(74) *Attorney, Agent, or Firm* — John Alumit

(57) ABSTRACT

A solid state cup device that assists a coil over arrangement of an air suspension system for at least one motor vehicle wheel is disclosed. The device comprises at least one outer cup having a plurality of o-rings placed on the coil over arrangement. The system further includes at least one inner cup having a plurality of smaller o-rings, and which inner cup is placed on top of at least one spring. The at least one outer cup further includes at least one c-ring designed to prevent the at least one inner cup from sliding out of the at least one outer cup. With air injected into the at least one outer cup, the at least one inner cup may press down the at least one spring to provide tension on the at least one spring resulting in a smoother lift and lowering of the at least one motor vehicle.

10 Claims, 6 Drawing Sheets

CUP DEVICE FOR ADDITIONAL SUSPENSION

CROSS-REFERENCE TO RELATED APPLICATION

None

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to suspension systems for motor vehicles, and more particularly to a solid state cup device that assists a coil-over arrangement of an air suspension system by providing a smoother lift and lowering of a motor vehicle in motion.

Motor vehicles that provide comfort and style are in high demand. State-of-the-art accessories are often installed in motor vehicles to enhance comfort and style. Many accessories are available in the marketplace that are specifically designed to improve the appearance and adjust the height of almost any brand of motor vehicle. Suspension systems are widely used in motor vehicles to enhance the quality of ride. Different types of suspension systems include an air-bag suspension system, a can-over suspension system, and an air tank cylinder suspension system.

An air-bag suspension system consists of strong rubber bags that act as an air container. The bags are connected to an air compressor. As the air compressor pumps air into the bag, it inflates, which in turn raises the vehicle. When the air is released from the bag, it lowers the vehicle. Components of an air bag unit consists of two heavy duty compressors, one or two 4 or 5 gallon air tanks, W-Lock fitting, pressure switches, and solenoids. U.S. Pat. No. 3,694,001 to McGee describes an air-bag suspension system, comprising an air bag between an axle and the frame of a vehicle that can raise or lower the axle by inflating or deflating.

A can-over suspension system is similar to the air-bag suspension system. In an air-bag suspension system, the airbag sits on top of the strut, replacing the springs, or on top of the springs. However, in a can-over suspension system, a smaller bag is wrapped around the strut, eliminating the springs all together. A motor vehicle would be 100% dependent on the bags in a can-over suspension system, making it impossible to ride without the bag inflated.

An air tank cylinder system is made with a cast material that sits on top of a coil over suspension. Components of the air tank cylinder system include a 3 gallon air tank, a high speed compressor, a paddle valve switch, a 200 psi dual needle gauge, shock absorbers, and 4 air cylinders.

Other suspension systems are known. For example, U.S. Pat. No. 5,603,387 issued to Beard describes an active vehicle suspension employing a multi-point support system between a vehicle's chassis and cab. Each support point has an isolator which includes a linear hydraulic actuator that is connected at its quiet end to the payload by a passive vibration isolator and is connected at its vibrating end to the chassis. Each isolator also has a support spring to off-load the majority of the weight of the cab from the hydraulic actuator. An accelerometer is mounted to sense movement at a point between the linear hydraulic actuator and the passive vibration isolator. An electrical signal produced by the accelerometer is processed to operate a hydraulic valve that controls movements of the hydraulic actuator so that transmission of vibrations from the chassis to the cab is attenuated.

Another example of a suspension system is U.S. Pat. No. 4,619,467 to Lafferty which describes an air spring apparatus for vehicle suspension. An active air cylinder and piston of the apparatus are connected in series with the vehicle suspension. An inactive air cylinder constituting an air column extension of the active air cylinder is connected in series with the active air cylinder by an air conduit. The spring rate of the system is automatically adjustable to produce optimum isolation of impulsive forces and to maintain the forces on the road under dynamic conditions essentially equal to those forces under static conditions.

Unlike Beard and Lafferty, the present invention does not replace a vehicle normal suspension system, but instead is an adjunct to an existing coil over suspension system for additional support in the lifting and lowering of a motor vehicle in motion.

All of the above-mentioned inventions are complex and contain electronic and rubber components, making them more subject to failure. For example, solenoids would tend to get stuck due to dust accumulation, causing the system to fail, which may also damage other vehicle systems. Rubber parts are easily punctured by objects on the road that are swept up from the tire, causing pressure loss. Failure of the suspension system often renders the vehicle immobile. Finally, not only does the complexity of these systems make them more subject to failure, they are also more difficult to install or replace.

Instead of designing a new and more complex suspension system that may be subject to failure, the present invention provides a solution for added vehicle suspension support in the form of a car accessory that may be added to any coil over suspension systems. It comprises no electronic components or rubber parts, and is completely mechanical. Moreover, the suspension device is easy to install, designed to withstand daily wear and tear, and would not render the vehicle immobile should failure result. The inventive device is placed on top of any coil over suspension system, thereby making a ride more comfortable. There are no air bags that can cause pressure loss or electronic components that can malfunction, and since the device is comprised of aluminum, the device may also withstand daily wear and tear. Should failure of the inventive device occur, the vehicle may still operate with the existing coil-over suspension system. Other objects of the present invention will become better understood with reference to appended Summary, Description and claims.

SUMMARY

The present invention is a solid state cup device that assists a coil over arrangement of an air suspension system for at least one motor vehicle wheel. The system comprises at least one outer cup having a plurality of o-rings placed on the coil over arrangement. The system further includes at least one inner cup having a plurality of smaller o-rings placed on top of at least one spring. With air injected into the at least one outer cup, the at least one inner cup may press down the at least one spring to provide tension on the at least one spring, resulting in a smoother lift and lowering of the at least one motor vehicle.

The outer cup further includes at least one c-ring. The c-ring is designed to prevent the inner cup from sliding out of the outer cup, thereby making the invention a solid state cup device. The plurality of small o-rings may be designed to provide protection from the leakage of air. The outer cup may be adapted for receiving at least one air injecting means. The plurality of o-rings may be arranged in the inner diameter of the outer cup for providing protection from the leakage of air.

Although particular embodiments of the present invention have been described in the foregoing description, it is to be understood that the present invention is not to be limited to just the embodiments disclosed, but that they are capable of numerous rearrangements, modifications and substitutions without departing from the description herein.

FIGURES

REFERENCE NUMERALS

Figure 1:
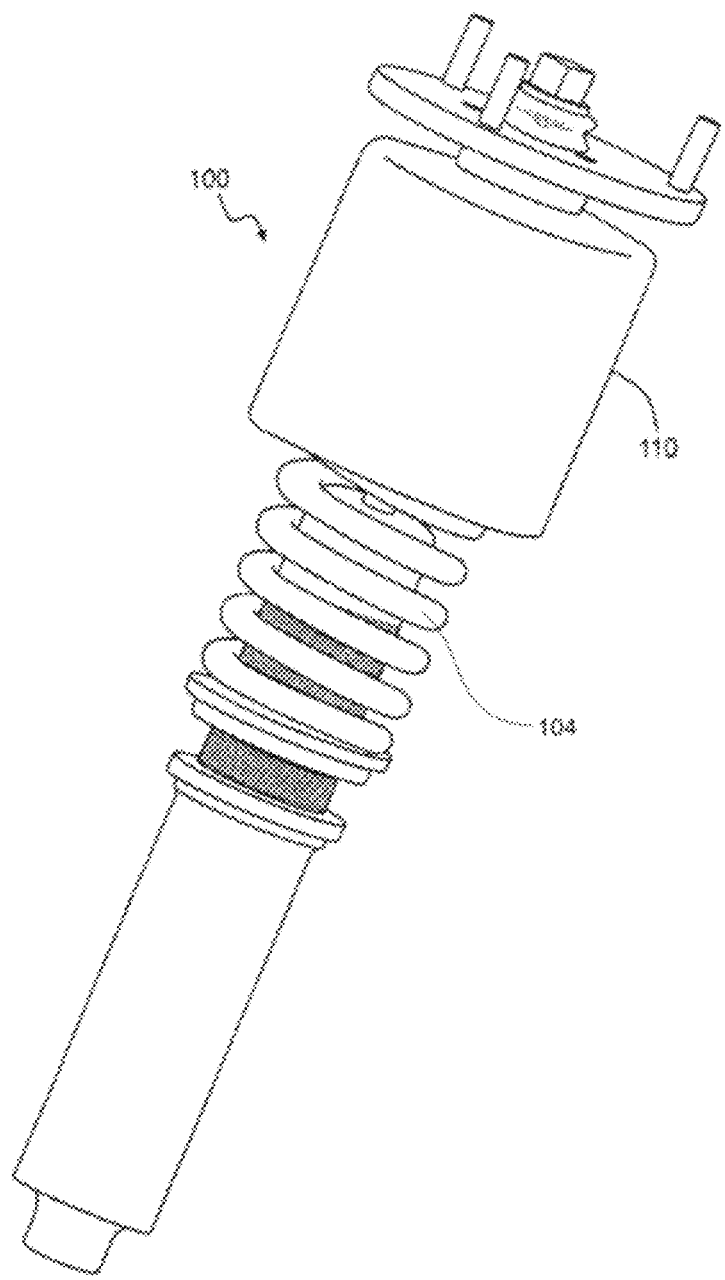
FIG. 1 is a perspective view of the present invention, illustrating a solid state cup device that assists a coil over arrangement of an air suspension system for at least one motor vehicle wheel.

100 . . . A solid state cup device
104 . . . A spring
110 . . . At least one outer cup
112 . . . A plurality of o-rings
120 . . . At least one inner cup
122 . . . A plurality of smaller o-rings
130 . . . At least one c-ring
160 . . . Switch
161 . . . Air compressor
162 . . . Inlet to the reserve tank
163 . . . Reserve Tank
164 . . . Exit air leaving reserve tank
165 . . . Pressure switch to activate or de-activate compressor
166 . . . Air moving from the air compressor in the direction of Solid State Cup
167 . . . Opening in Solid State Cup
168 . . . Air released from the Solid State Cup

DESCRIPTION

Referring to the drawings, a preferred embodiment illustrates a solid state cup device 100 that assists a coil over arrangement of an air suspension system for a motor vehicle wheel and generally indicated in FIGS. 1 through 4. Referring to FIG. 1, the system 100 comprises an outer cup 110 having a plurality of o-rings (not shown) placed on the coil over arrangement. The system further includes at least one inner cup (not shown) having a plurality of smaller o-rings (not shown), and the at least one inner cup is placed on top of at least one spring 104. With air injected into the at least one outer cup (not shown) 110, the at least one inner cup (not shown) may press down the at least one spring 104 to provide tension on the at least one spring 104 resulting in a smoother lift and lowering of the motor vehicle. The coil over arrangement can be a strut-spring arrangement.

Figure 2:
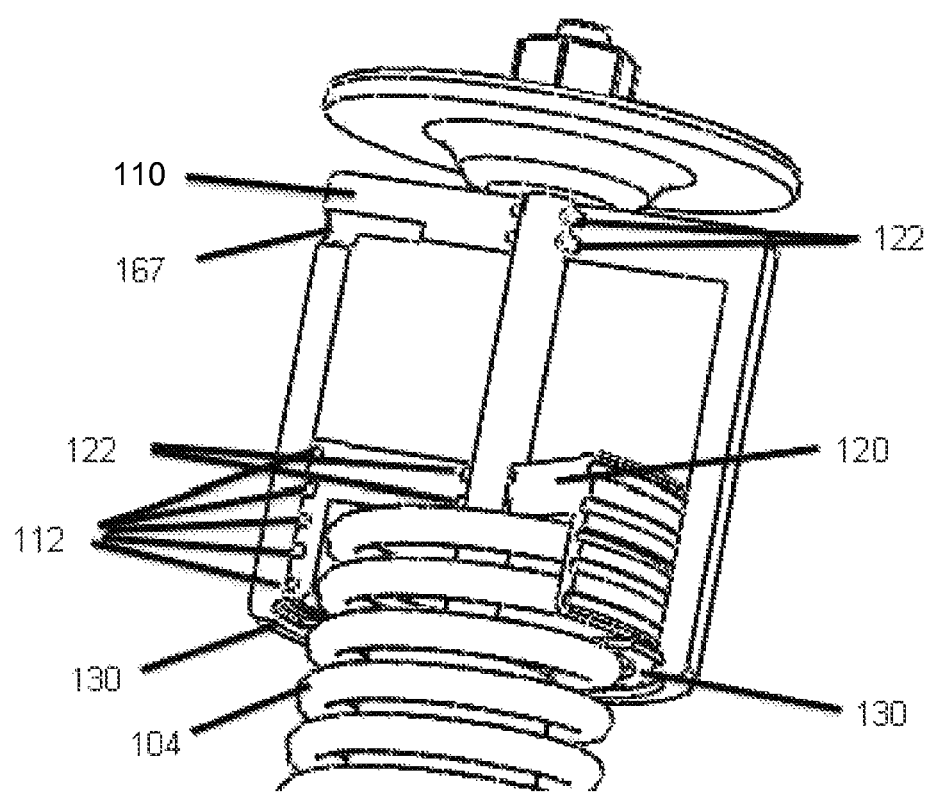
FIG. 2 is a cut-away view of the present invention, illustrating the arrangement of the at least one outer cup, at least one inner cup, at least one c-ring, a plurality of o-rings and a plurality of smaller o-rings.

FIG. 2 illustrates the arrangement of the outer cup 110, the inner cup 120, a c-ring 130, a plurality of o-rings 112 and a plurality of smaller o-rings 122. The outer cup 110 has a plurality of smaller o-rings 112 122, and is placed on the coil over arrangement. The inner cup 120 has a plurality of o-rings 112 and smaller o-rings 122, and the inner cup 120 is placed on top of a spring 104. The at outer cup 110 further includes a c-ring 130. The c-ring may hold approximately 4000 pounds. The c-ring is designed to prevent the inner cup 120 from sliding out of the outer cup 110 making the invention a solid state cup device 100, where there is no need to inflate any part to raise or lower the motor vehicle, thereby providing a quicker response-reaction and a smoother raising and lowering of the motor vehicle. The plurality of small o-rings 122 is designed to provide protection from the leakage of air. The outer cup 110 is adapted for receiving at least one air injection means through an opening 167. The plurality of o-rings 112 is arranged in the inner diameter of the outer cup 110 for providing protection from the leakage of air. The cup device 100 can be made from materials such as aluminum, titanium, iron, steel, or wood. Given the weight of motor vehicles the cup device 100 can be air leak protected by way of a dual-quad air leak protection mechanism. The solid state cup device 100 can be used with or without air, unlike most air suspension systems where it is not recommended to ride without or minimal air as it may cause the suspension system to fail.

Figure 3:
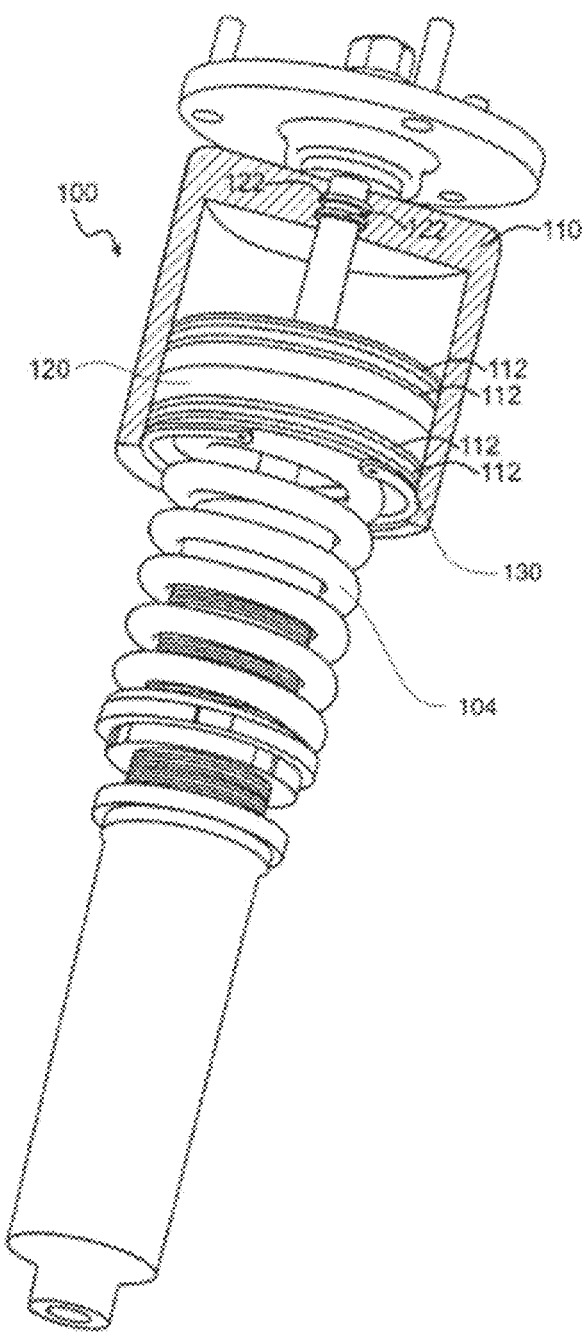
FIG. 3 is a cut-away view of the present invention, illustrating the solid state cup device in a raised position.
Figure 4:
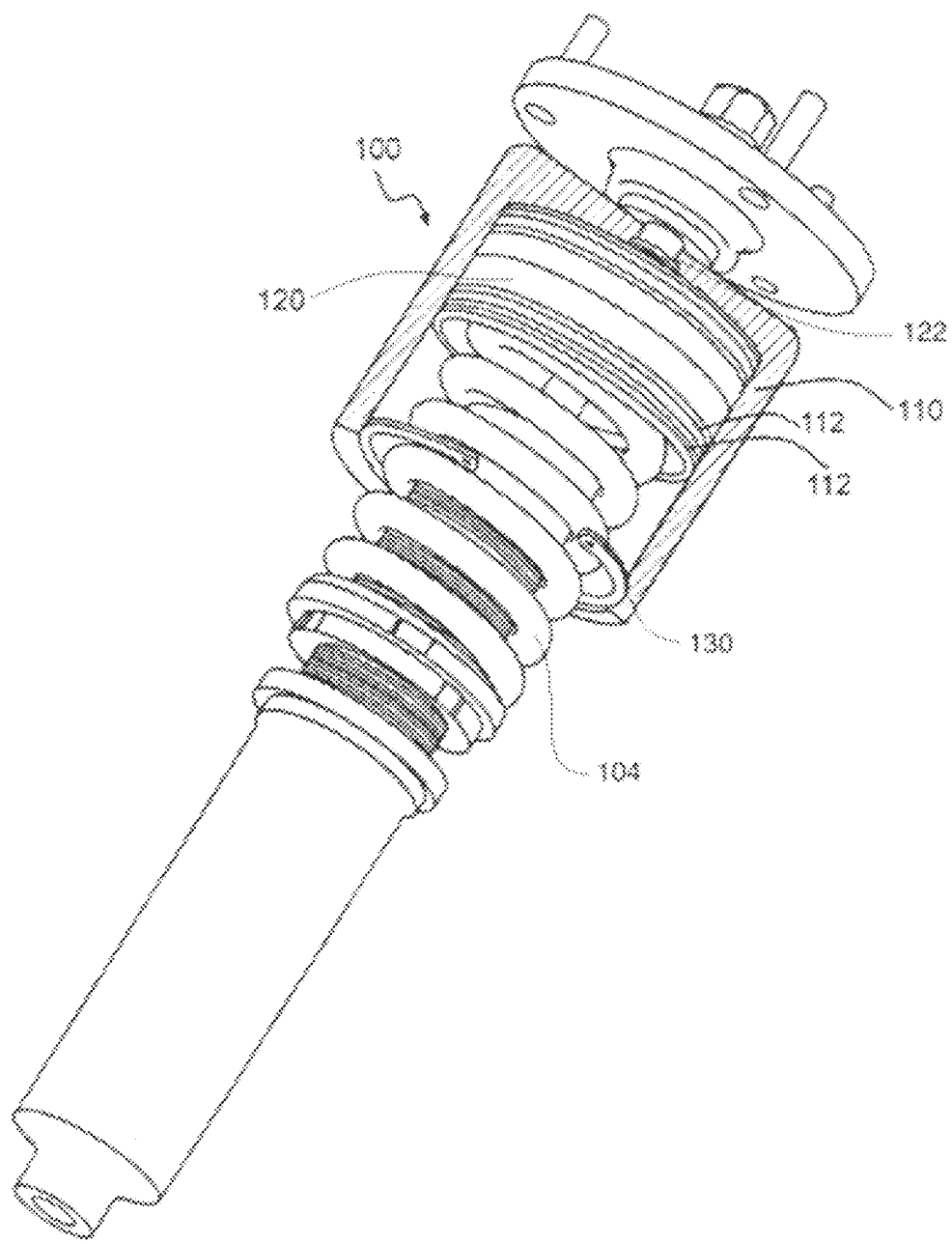
FIG. 4 is a cut-away view of the present invention, illustrating the solid state cup device in a lowered position.

FIGS. 3 and 4 illustrate the movement of the solid state cup device 100. The solid state cup device is adapted to move from a raised position to a lowered position and vice versa. With air injected into the outer cup 110, the inner cup 120 can press down the spring 104 to provide tension on the spring 104 resulting in a smoother lift and lowering of the motor vehicle. The plurality of o-rings 112 and the plurality of smaller of o-rings 122 attached to the inner cup 120, are adapted to move in conjunction with the movement of the inner cup 120. FIG. 3 is an illustration of the solid state cup device 100 in a raised position. FIG. 4 is an illustration of the solid state cup device 100 in a lowered position.

Figure 5:
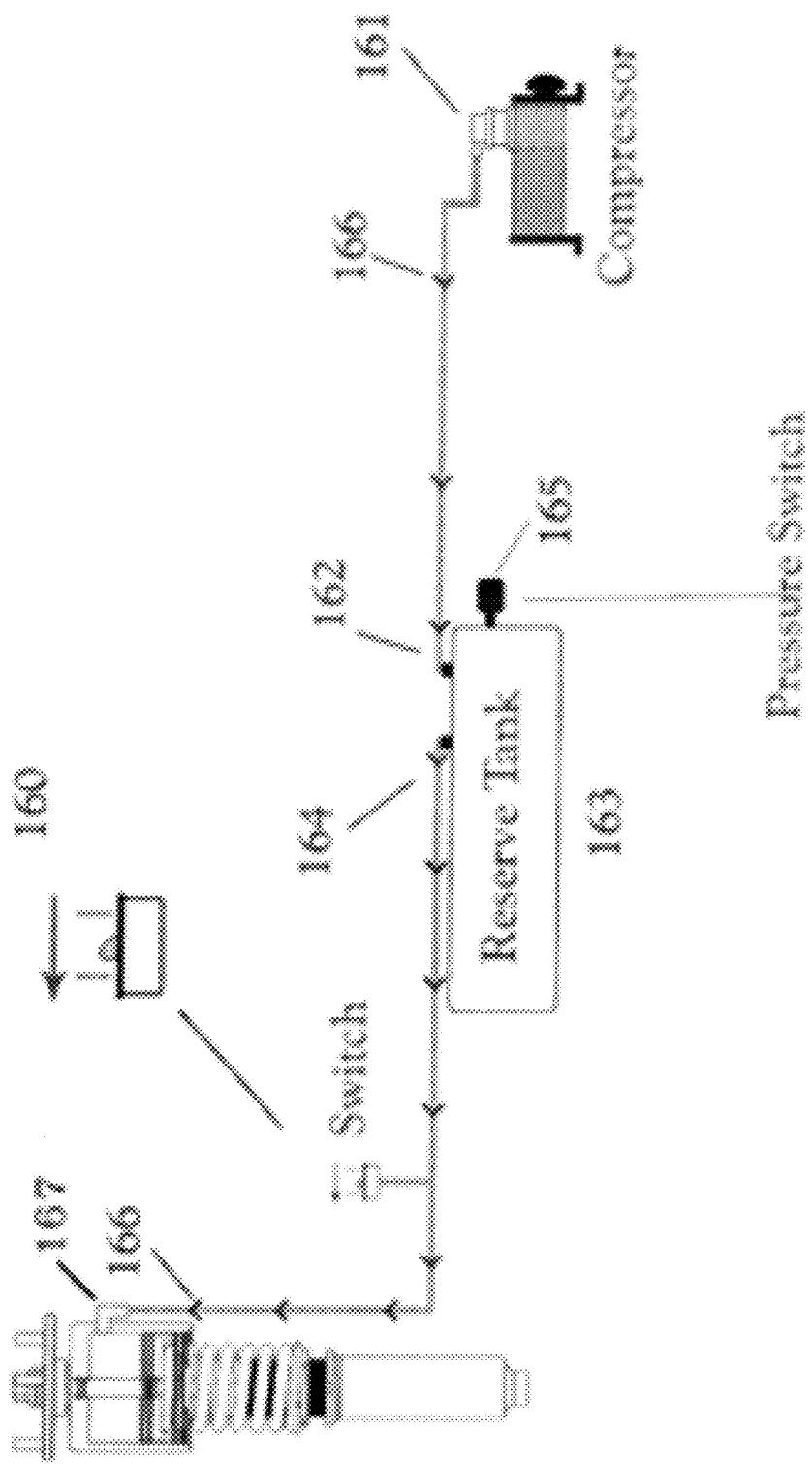
FIG. 5 is a diagram showing the direction of air flow from the compressor to the solid state cup device, pressing the inner cup down to raise suspension.
Figure 6:
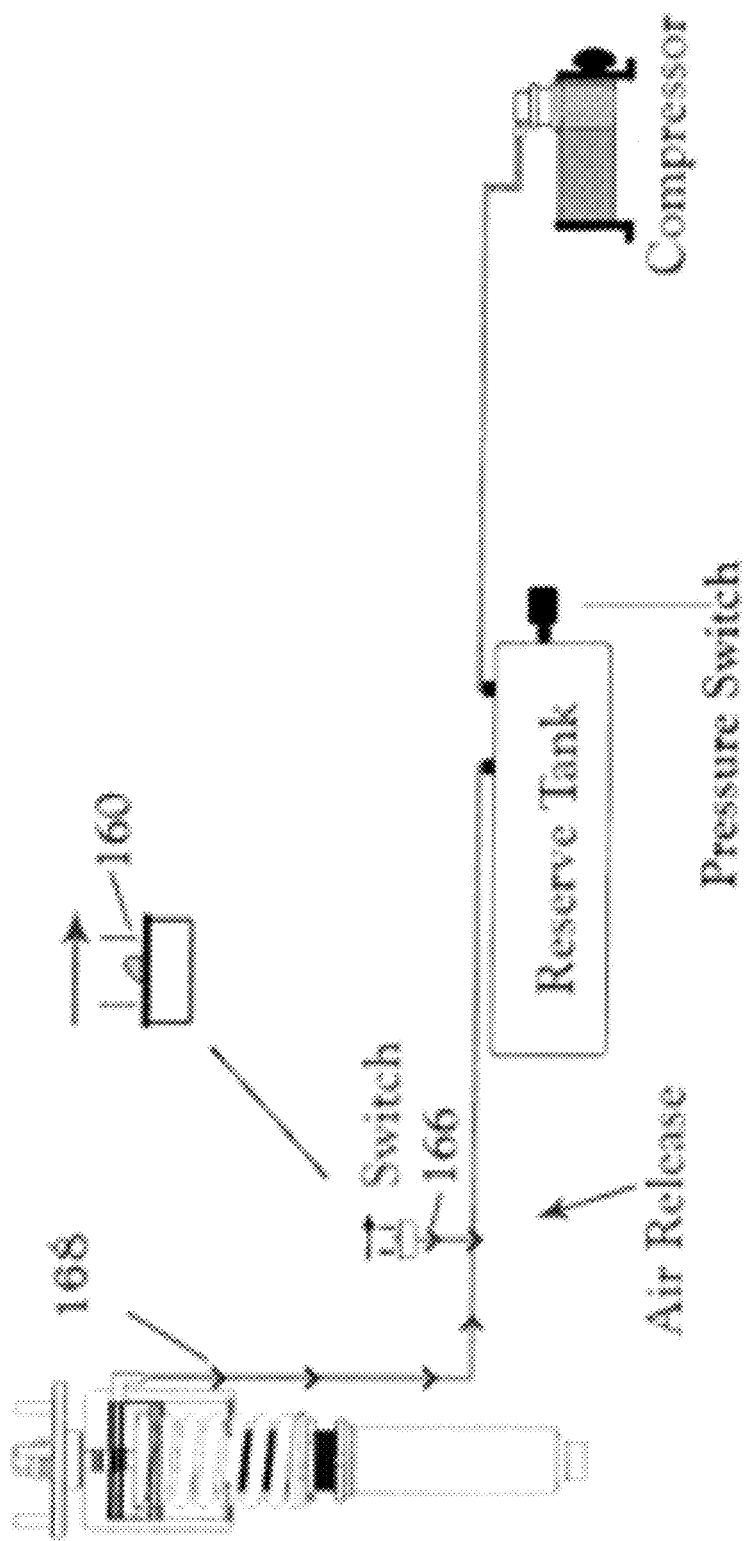
FIG. 6 is a diagram of air being release from the solid state cup device, allowing the inner cup to be raised and lowering the suspension.

FIGS. 5 and 6 show the movement of air from the compressor 161 through a reserve tank 163 and into the solid state cup that is adapted to receive air injection. A user activates a switch 160. With the pressure switch 165 on the reserve tank 163 is also activated, air moves from the compressor 161 in the direction 166 of the solid state cup, by first entering an inlet 162 to the reserve tank 163, and then existing the reserve tank 164, then into the solid state cup through an opening 167, into which air is injected, forcing the inner cup down and raising the suspension. When the switch 160 is deactivated, air is released 168 from the sold state cup, allowing the inner cup to rise and lower the suspension.

The solid state cup device 100 is easy to install. The original oem suspension is first removed. Then with the aftermarket coil-over suspension, the solid state cup device 100 is assembled to the coil-over suspension and reinstalled back on to the vehicle. Then ¼ tubing lines are installed to the solid state cup device 100 and routed through the inside of the vehicle to the valve command switch 160, air compressor 161 (preferably 12v), and air reserve tank 163. The air compressor 161 and the reserve tank 163 are installed in the trunk.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A solid state cup device that assists a coil over arrangement of an air suspension system for at least one motor vehicle wheel, the device comprising: at least one outer cup having a plurality of o-rings placed on the coil over arrangement; and at least one inner cup having a plurality of smaller o-rings, said at least one inner cup placed on top of at least one spring; whereby with air injected into the at least one outer cup, the at least one inner cup may press down the at least one spring to provide tension on the at least one spring resulting in a smoother lift and lowering of the at least one motor vehicle wheel.

2. The solid state cup device of claim 1, wherein the at least one outer cup includes at least one c-ring to prevent the at least one inner cup from sliding out of the at least one outer cup.

3. The solid state cup device of claim 1, wherein the at least one outer cup may be adapted for receiving at least one air injecting means.

4. The solid state cup device of claim 1, wherein the plurality of o-rings are arranged in an inner diameter of the at least one outer cup for providing protection from an air leak.

5. The solid state cup device of claim 1, wherein the at least one coil over arrangement is a strut-spring arrangement.

6. The solid state cup device of claim 1, wherein the at least one solid state cup device is made from aluminum, titanium, iron, steel, or wood.

7. The solid state cup device of claim 1, wherein the at least one cup device may be made from an aluminum alloy.

8. The solid state cup device of claim 7, wherein the alloy is a 6061 aluminum material.

9. The solid state cup device of claim 1, wherein the at least one solid state cup device is air leak protected by way of a dual-quad air leak protection mechanism.

10. The solid state cup device of claim 1, wherein the cup device is adapted to move from a raised position to a lowered position, and vice versa.

* * * * *